(No Model.)　　　　　　　　　　　　　　　　3 Sheets—Sheet 2.
J. R. BANE.
COMBINED HARROW, ROLLER, AND SEEDER.
No. 284,709.　　　　　　　　Patented Sept. 11, 1883.

Witnesses
Geo. H. Strong.
J. H. Nourse

Inventor
Jas. R. Bane
By
Dewey & Co.
Attorneys (No Model.) 3 Sheets—Sheet 3.
J. R. BANE.
COMBINED HARROW, ROLLER, AND SEEDER.
No. 284,709. Patented Sept. 11, 1883.
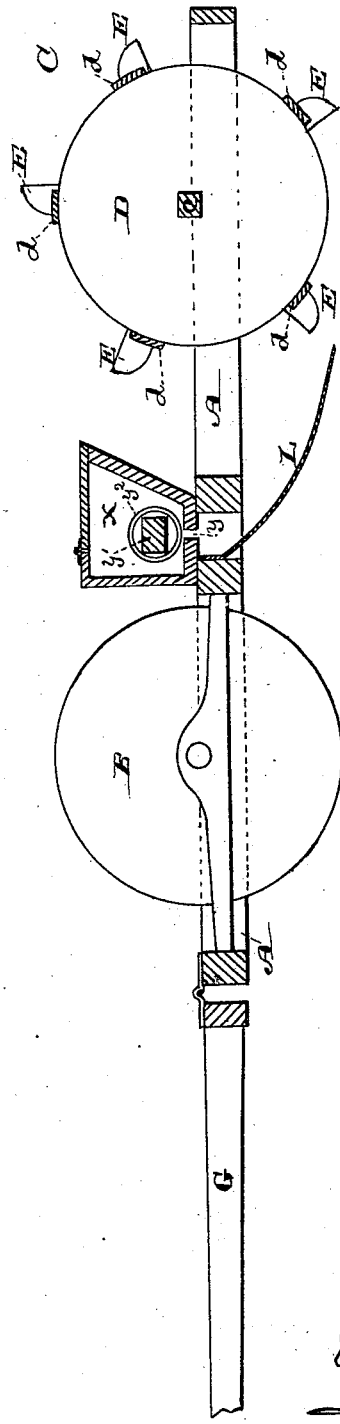
Witnesses,
Geo. H. Strong
Inventor
Jas. R. Bane
By Dewey & Co.
Attorneys

UNITED STATES PATENT OFFICE.

JAMES R. BANE, OF GILROY, CALIFORNIA.

COMBINED HARROW, ROLLER, AND SEEDER.

SPECIFICATION forming part of Letters Patent No. 284,709, dated September 11, 1883.

Application filed February 10, 1883. (No model.)

*To all whom it may concern:*

Be it known that I, JAMES R. BANE, of Gilroy, county of Santa Clara, State of California, have invented an Improved Combined Harrow, Roller, and Seeder; and I hereby declare the following to be a full, clear, and exact description thereof.

My invention relates to a new and useful combined harrow, roller, and seeder, and to certain improvements therein, the nature of which will be shown in the course of the following description, and more particularly pointed out in the claims.

The object of my invention is to provide an effective and easy-working agricultural implement of this class.

Figure 1:
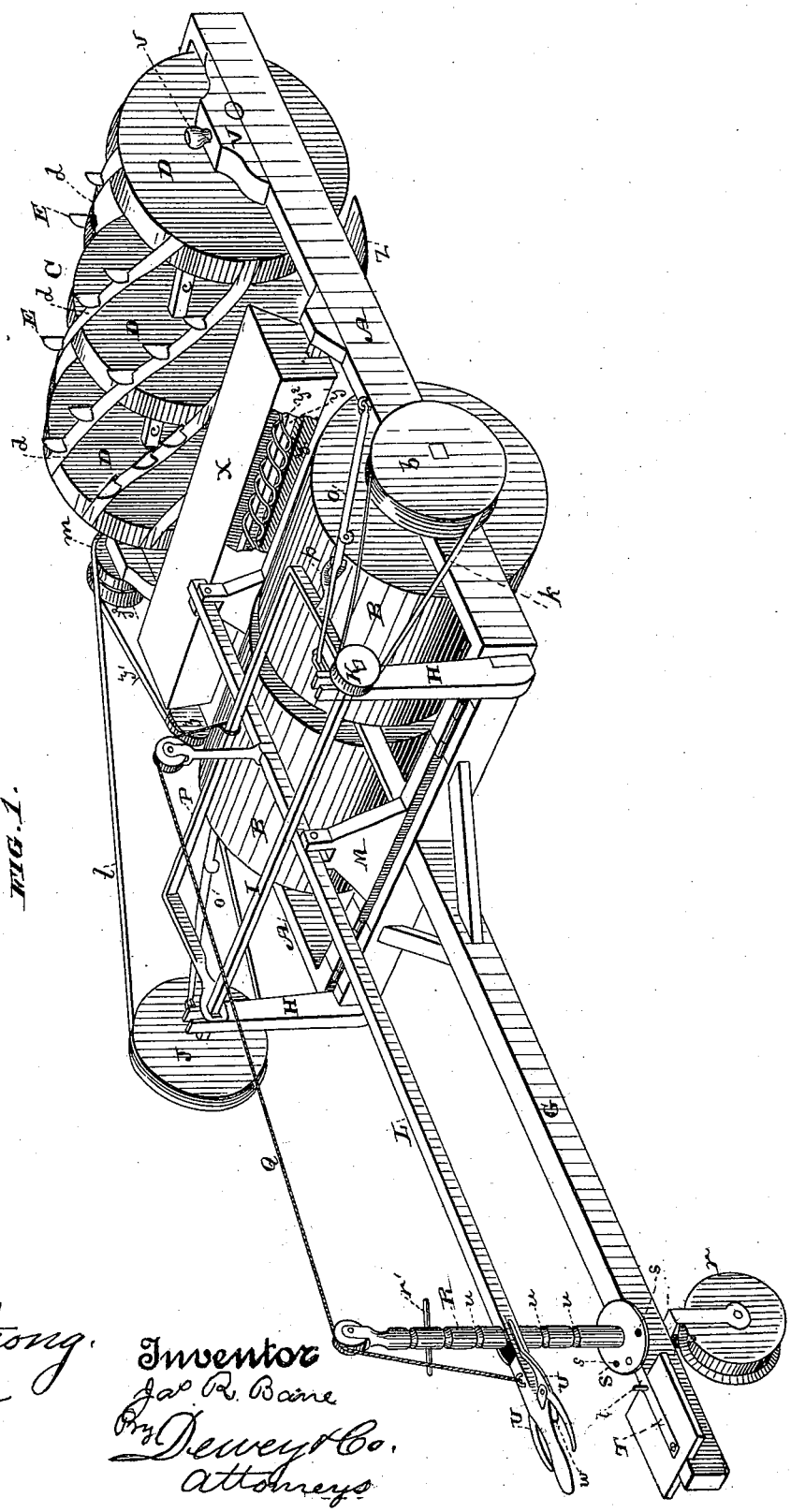
Figure 2:
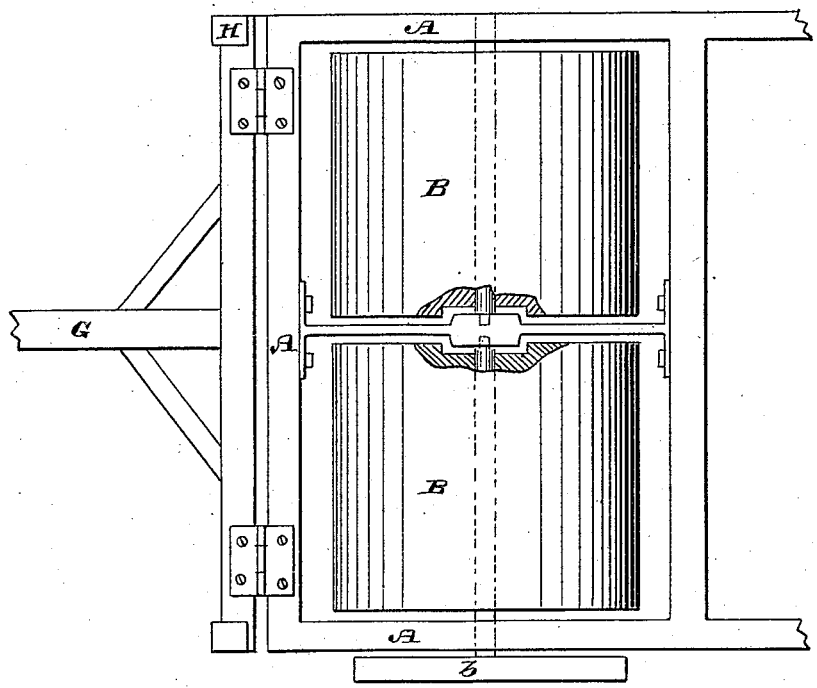
Figure 3:
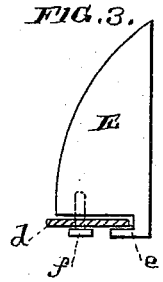
Figure 4:
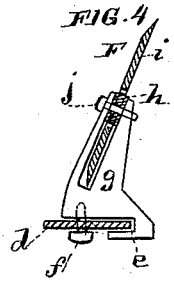
Figure 5:
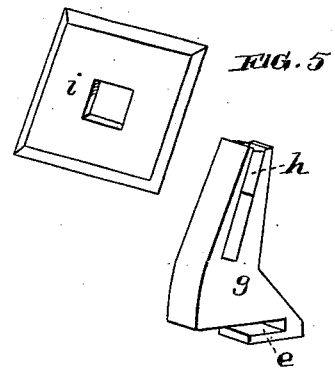
Figure 6:
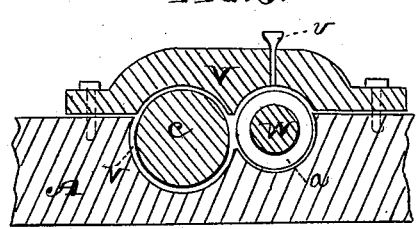
Figure 7:
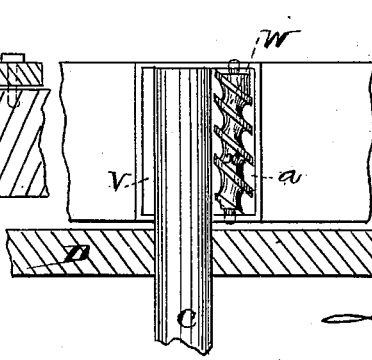

In the accompanying drawings, Figure 1, Sheet 1, is a perspective view of my device. Fig. 2, Sheet 2, is a plan of the divided roller B. Fig. 3 is a detail showing tooth E and the means for connecting it. Fig. 4 shows tooth F entire. Fig. 5 shows the parts of said tooth. Fig. 6 is a vertical section of lubricator-box. Fig. 7 is a plan view of same. Fig. 8, Sheet 3, is a section showing seeder and apron Z.

Let A represent the main frame of the device, across the rear portion of which is mounted, upon independent shafts, the two-part roller B. This is to allow the frame to turn, as is well known.

In the front portion of the frame is the harrow C. This consists of a transversely-mounted shaft, $c$, carrying disks D, across which are secured in a spiral course a number of parallel strips, $d$, upon which the teeth E are secured. These teeth are shown in Fig. 3, and consist of a triangular piece, the hypotenuse of which is preferably curved. They have a notch, $e$, to fit them onto the edge of the strip $d$, and they are secured thereon by a set-screw, $f$, passing up from beneath through the strip and entering the rear of the tooth. The tooth shown in this figure I find advantageous for use in soft or loose ground; but where the earth is hard and stiff I find a tooth, F, (shown in Figs. 4, 5,) to be better. This consists of a shank, $g$, having the same kind of a notch, $e$, to fit it on the strip $d$, and being adapted to be secured thereon in the same manner. The outer end of the shank is split, and to one inner edge is secured a square piece or lug, $h$.

A square plate, $i$, having beveled edges and a central square hole or socket, fits between the split ends of the shank, the square piece $h$ entering its central socket, and is there secured by a screw, $j$. This cutting-plate $i$ may be easily removed, and when dull may have another edge presented; and instead of being fitted in to cut square, it may be so fitted as to present its corner to cut the ground. This tooth acts more like a plow in cutting rather than in scratching the ground.

In placing the teeth upon the spiral strips I do not make them follow one another, but place each row a little to one side, so that in cutting or harrowing they shall operate over the entire surface of the ground.

Hinged to the rear of the frame A is the tongue G, from the rear cross end of which are supported standards H. In the tops of these is mounted a shaft, I, carrying a pulley, J, on one end, and a pulley, K, on the other.

A belt, $k$, extends from a pulley, $b$, upon the end of the roller-shaft to the pulley K, and a belt, $l$, extends from the pulley J to a pulley, $m$, upon the end of the shaft $c$ of the harrow C. Thus multiplied revolution is imparted from the traction-roller B to the harrow. This revolution of the harrow is not impeded by its teeth striking the ground, for but a single tooth of a strip strikes at a time. This is on account of the position of the strips $d$; and it has the further advantage of producing but a slight shock or jar, and enabling me for that reason to use a light frame for the harrow. Again, the harrow, in rapidly revolving forward, has a tendency to assist the progress of the machine.

L represents the lever by which the harrow is raised and lowered. It is fulcrumed on the rear of the frame A by a standard, M, and is joined to the center of the frame by a standard, as shown.

On account of the standards H being on the tongue G, when the harrow is raised by the lever L, the driving-belts $k$ and $l$ are slackened and no power is wasted. When the harrow is lowered, the belts tighten up again. The position of these standards and their height requires some kind of brace, and for this purpose I have the centrally-hinged brace-rods O attached to the tops of the standards and to the sides of the frame. These are so hinged as to bend upward, but not downward below a straight line. The reason for the bracing is to prevent the belts, when the harrow is at work, from straining the standards, and thus loosening the belts when they should be tight. These braces, by being hinged, allow the movement of the frame A and still stiffen the standards H.

In order to accomplish the movement of the hinged braces to allow the frame to move, I have the bent lever P, the ends of which are journaled on the driving-shaft I. The sides of this lever have projecting arms $p$, with bifurcated ends fitting over and under the upper half of the hinged braces. These serve to hold down or lift up the braces, as will be seen. A cord, Q, is attached to the center of the lever and passes back over a pulley in the top of the rudder-post R and down to the lever L, to the end of which it is secured. Now, when the end of the lever is depressed, the cord Q pulls up the bent lever P, and raises it a distance equal to the length of the arc inscribed by the handle end of lever L. This lever P, through its bifurcated arms $p$, thus bends upward the hinged braces O faster than the working end of the main lever rises, so that the effect of the movement of the main lever upon the frame A may take place without the toggle-braces O interfering by reason of their being elevated too slowly. The arms $p$, supporting the hinged braces, render them as much braces when bent as when straightened out.

The rudder-post R is journaled in the rear end of the tongue, and is connected firmly with the rudder-wheel $r$. This wheel is constructed with a flat center and two flanges on its edges for entering and taking hold of the ground. The flat center of the wheel is designed to roll down that portion of the ground missed by the center of the main roller B, which is constructed in two parts, the inner edges of which are separated to allow the center brace to enter, Fig. 2.

The operator stands on the projecting end of the tongue and turns the rudder-post by means of a handle, $r'$. In order to set it in any desired position there is a plate or disk, S, secured upon it just above the tongue. In the rim or edge of the plate are holes $s$, with which the point of a spring, T, is adapted to engage to hold the plate. A small lug, $t$, upon the spring is for the driver to put his foot upon to depress the spring and throw its point out of engagement with the plate when desired. The plate S, being fitted close to the tongue, prevents the rudder-post or rudder-wheel from leaning, but keeps both erect.

In order to set the main lever L when adjusted, the rudder-post R is provided with a number of peripheral grooves, $u$.

Upon the sides of the lever are pivoted pawl-levers U, the ends of which are made concave, as shown, and are held in engagement with the grooves $u$ by means of springs $w$. By pressing in on the levers U their concave ends are thrown out of engagement with the grooves $u$, and the lever L may be adjusted.

It is of prime necessity that the harrow C shall turn in the bearings with the least friction. In order to accomplish this I have a means for lubricating its bearings, which are particularly shown in Figs. 6, 7.

V represents the box or bearing of the shaft $c$, and $v$ is the oil-hole in its top. The bearing V has a small chamber, $a$, alongside of it, in which is journaled a short rubber roller, W, lying parallel with shaft $c$. The surface of this roller has made in it a spiral groove, $x$. The oil is poured into the box and collects in its bottom. The shaft and roller impinge, and by the revolution of the former the latter is revolved and constantly supplies the oil to the shaft, thus rendering the device self-lubricating.

In the center of the frame A is the seeder X. This consists of a trough having a longitudinal slot, $y$, in its bottom.

In the trough is a shaft, $y'$, having a spiral flange, $y^2$. The shaft projects through the trough, and carries a pulley, $z$. A belt, $z'$, from this pulley to a pulley, $z^2$, upon the end of the main harrow-shaft, furnishes revolution to the flanged shaft $y'$, whereby the seed is agitated in the trough and caused to fall down through the slot $y$; and, further, when the revolution of the harrow-cylinder ceases, that of the seed-feeding device ceases also.

Connected with the bottom of the seed-trough is a curved directing-apron, Z, the edge of which extends down nearly to the ground, and as close as possible to the harrow, so as to deposit the seed directly in the cuts made by the harrow-teeth.

From the construction and position of my rudder and post the driver may add a comfortable seat without interference.

Having thus described my invention, what I claim as new, and desire to secure by Letters Patent, is—

1. The harrow-cylinder, seed-feeding device, roller, and means for lifting the harrow-cylinder, in combination with the pulleys $b$, K, J, $m$, and $z$, and the belts $k$, $l$, and $z'$, arranged substantially as described, as and for the purpose set forth.

2. The harrow-teeth E, having a triangular body and a notched base, $e$, as shown, in combination with the strip $d$ and screw $f$, substantially as herein described.

3. The frame A, the harrow-cylinder C, and the tongue G, attached to the hinged standards H, in combination with the roller B and the means for transmitting revolution to the harrow-cylinder, consisting of the driving-shaft I, mounted in hinged standards H, and belts $k$ $l$, connecting the pulleys of said shaft with those of the roller and harrow-cylinder, substantially as herein described.

4. The frame A, harrow-cylinder C, tongue

G, hinged to the rear of the frame, and lever L, for raising and lowering the harrow, in combination with the roller B, the standards H on the tongue G, driving-shaft I, and belts k l, connecting said shaft with roller and harrow, whereby revolution is imparted to said harrow, and at the same time, by the operation of the lever L, the driving-belts k l may be slackened or tightened, substantially as herein described.

5. The frame A, having revolving harrow C and roller B, the hinged tongue G, and main lever L, for raising or lowering the harrow, in combination with the driving-shaft I, standards H on the tongue, the hinged braces O, connected with standards H and frame A, and the means for raising or bending said hinged braces to allow the lever to operate, as set forth.

6. The frame A, having revolving harrow C and roller B, the hinged tongue G, and main lever L, for raising or lowering the harrow, in combination with the driving-shaft I, standards H on the tongue, the hinged braces O, connected with standards H and frame A, and the means for raising or bending said hinged braces to allow the lever to operate, consisting of the pivoted bent lever P, having bifurcated side arms, p, engaging with the hinged braces, and the cord Q, secured to said bent lever P and to the rear end of the main lever L, substantially as herein described.

7. The rudder-post R and rudder-wheel r, connected as shown, in combination with the means for setting them in any position, consisting of the perforated plate S upon the post and the spring T, the point of which engages with the perforated plate, substantially as herein described.

8. The rudder-post R, having peripheral grooves u, in combination with the main lever L and the spring lever-pawls U, having concaved ends engaging with the grooves of the post to set the lever where adjusted, substantially as herein described.

9. The journal box or bearing V, having a rubber roller, W, with a spirally-grooved face journaled in a chamber, a, in combination with a rotating shaft mounted in said box lying parallel with and impinging against said roller, substantially as herein described.

10. The harrow-cylinder C, having shaft c, in combination with the box or bearing V, in which said shaft is journaled, and the rubber roller W, mounted in said box and impinging upon the shaft c, substantially as herein described.

11. The revolving harrow-cylinder C, having teeth E, as shown and described, in combination with the seed box or trough X, having a slot, y, and a means for feeding the seed through the slot, consisting of the square shaft $y'$, having a spiral flange, $y^2$, and mechanism for revolving the same, and the curved directing-apron Z, for carrying the seed to the ground under the harrow-cylinder, substantially as herein described.

In witness whereof I hereunto set my hand.

JAMES R. BANE.

Witnesses:
DWIGHT S. WHITNEY,
JOHN HOLLAWAY.